US005379753A

United States Patent [19]
Noennich

[11] Patent Number: 5,379,753
[45] Date of Patent: Jan. 10, 1995

[54] SOLAR PANEL CONTROL APPARATUS

[76] Inventor: Cecil C. Noennich, 142 Sunset St., Ridgecrest, Calif. 93555

[21] Appl. No.: 165,176

[22] Filed: Dec. 13, 1993

[51] Int. Cl.6 .............................................. F24J 2/38
[52] U.S. Cl. ..................................... 126/608; 126/607
[58] Field of Search ........................ 126/608, 607, 600

[56] References Cited

U.S. PATENT DOCUMENTS 4,402,582  9/1983  Rhodes ............................... 126/607
4,700,690  10/1987  Strickland ........................... 126/607

Primary Examiner—Carroll B. Dority
Attorney, Agent, or Firm—Michael J. Colitz, Jr.

[57] ABSTRACT

A solar panel control apparatus for varying the position of a solar panel mounted upon a roof comprising a solar panel support frame having a horizontal pivot rod mounted there beneath; a vertically receptacle collar having a clevis at its upper end rotatively receiving the pivot rod of the support frame and having a recess extending upwardly from its lower end with internal threads at its lower extent and a cylindrical cavity between the threads and the upper end; a rotatable shaft having a threaded upper end cooperatively secured with the threads of the collar and a handle whereby rotation of the shaft through the handle will act to raise and lower the collar and pivot with the support frame; a turret having a downwardly extending cavity having surfaces adapted to receive the collar; and a turret support plate with a upper face to support the turret, the turret plate having a wheel within the modular home to effect rotation of the plate and the turret whereby rotation of the handle will vary the angular orientation of the support structure with respect to the support plate and the roof while rotation of the wheel will vary the rotational position of the solar panel with respect to the horizontal support plate and roof.

3 Claims, 3 Drawing Sheets

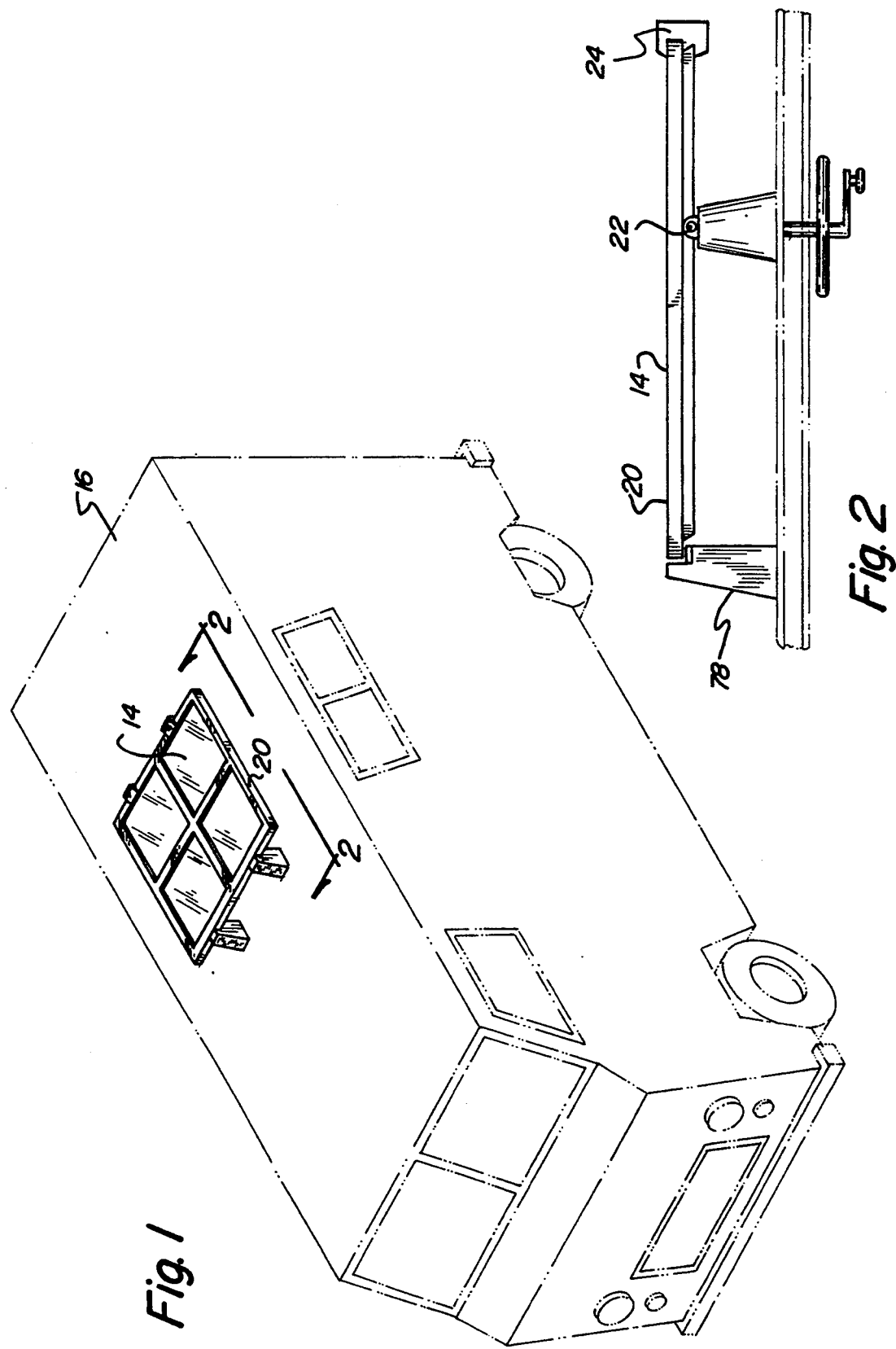

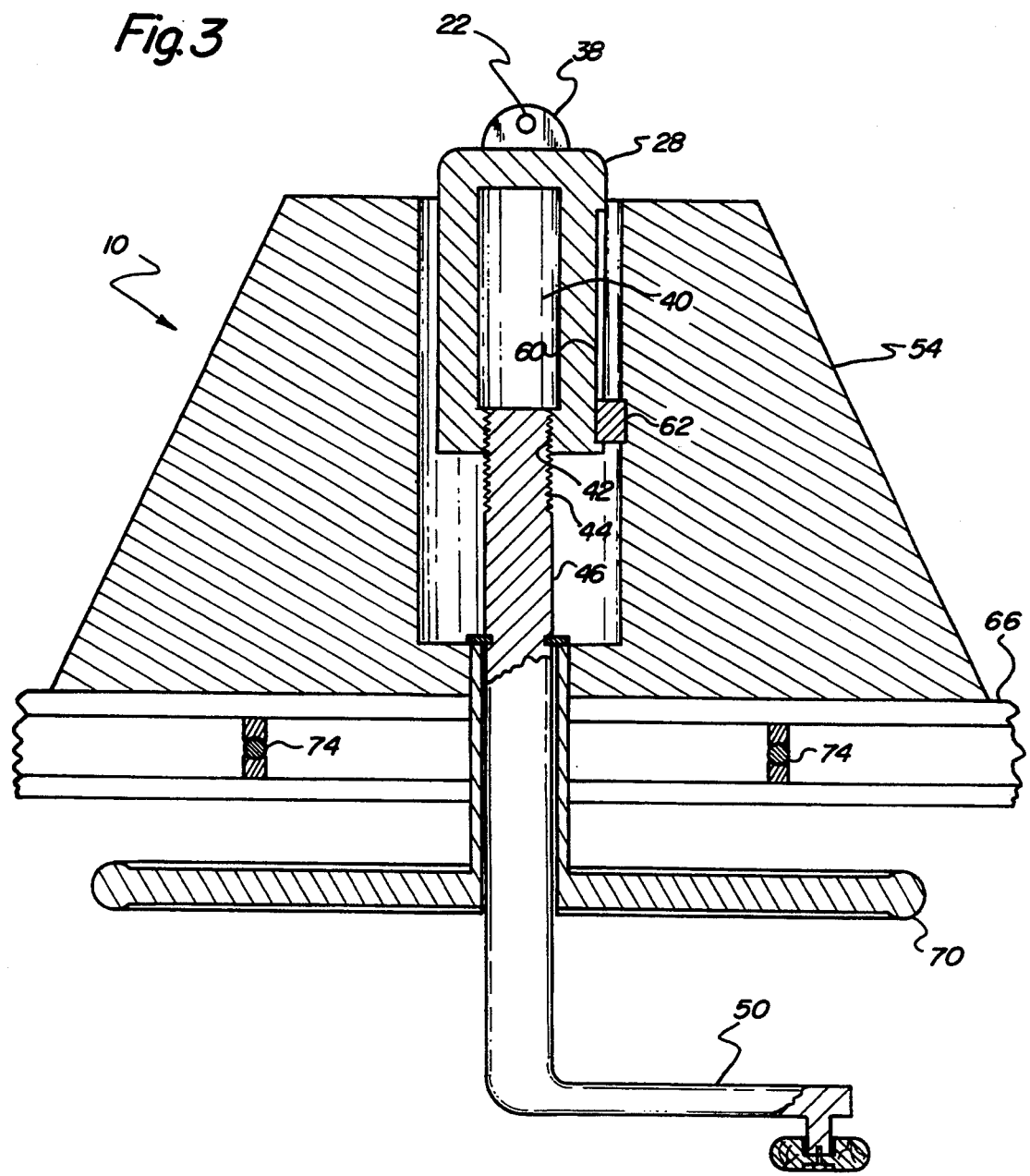

SOLAR PANEL CONTROL APPARATUS

BACKGROUND OF THE INVENTION

1. Field of the Invention

The present invention relates to solar panel control apparatus and more particularly pertains to a solar panel which may be controlled by an operator within a motor home to vary its orientation.

2. Description of the Prior Art

The use of solar panels is known in the prior art. More specifically, solar panels heretofore devised and utilized for the purpose of generating electricity are known to consist basically of familiar, expected and obvious structural configurations, notwithstanding the myriad of designs encompassed by the crowded prior art which have been developed for the fulfillment of countless objectives and requirements.

By way of example, the prior art discloses various solar panel constructions. Note U.S. Pat. Nos. 4,787,367 to Crul; Des. 282,858 to Bowers and 4,622,951 to Matzkanin which disclose solar panels for the movement of water to be heated through a support frame. In addition, U.S. Pat. Nos. 4,794,909 to Elden and 4,300,537 to Davis disclose solar panel support frames with mechanisms for varying the orientation of the frame with respect to the sun. These later two patents have complex electronic control mechanisms for determining the position of the support frame.

In this respect, the solar according to the present invention substantially departs from the conventional concepts and designs of the prior art, and in so doing provides an apparatus primarily developed for the purpose of varying its position with respect to the sun.

Therefore, it can be appreciated that there exists a continuing need for new and improved solar panels which can be positioned by an operator. In this regard, the present invention substantially fulfills this need.

SUMMARY OF THE INVENTION

In view of the foregoing disadvantages inherent in the known types of solar panels now present in the prior art, the present invention provides an improved solar panel control apparatus. As such, the general purpose of the present invention, which will be described subsequently in greater detail, is to provide a new and improved solar panel control apparatus and method which has all the advantages of the prior art and none of the disadvantages.

To attain this, the present invention essentially comprises a solar panel control apparatus for varying the position of a solar panel mounted upon the roof of a modular home comprising, in combination a solar panel support frame in a generally rectangular configuration and having a horizontal pivot rod mounted there beneath at a central extent thereof with weight means along one edge; a vertically receptacle collar having a clevis at its upper end rotatively receiving the pivot rod of the support frame and having a recess extending upwardly from its lower end with internal threads at its lower extent and a cylindrical cavity between the threads and the upper end; a rotatable shaft having a threaded upper end cooperatively secured with the threads of the collar and an operator controlled handle at its lower end extending to within the modular home whereby rotation of the shaft through the handle will act to raise and lower the collar and pivot with the support frame; a turret having a downwardly extending cavity having surfaces adapted to receive the collar with a slot and a spline to preclude rotational movement between the turret and shaft; a turret support plate with a upper face to support the turret, the turret plate having a downwardly located operator controlled wheel within the modular home to effect rotation of the plate and the turret; a bearing assembly between the upper surface of the roof of a modular home and the lower surface of the support plate whereby rotation of the handle will vary the angular orientation of the support structure with respect to the support plate and the roof of a vehicle while rotation of the wheel will vary the rotational position of the solar panel with respect to the horizontal support plate and roof of the modular home; and outstanding support members positioned on the support plate to limit the vertical movement of the end of the solar panel support remote from the weight means.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved solar panel control apparatus which has all the advantages of the prior art solar panels and none of the disadvantages.

It is another object of the present invention to provide new and improved solar panel control apparatus which may be easily and efficiently manufactured and marketed.

It is a further object of the present invention to provide a new and improved solar panel control apparatus which is of a durable and reliable construction.

An even further object of the present invention is to provide a new and improved solar panel control apparatus which is susceptible of a low cost of manufacture with regard to both materials and labor, and which accordingly is then susceptible of low prices of sale to the consuming public, thereby making such solar panel control apparatus economically available to the buying public.

Still yet another object of the present invention is to provide a new and improved solar panel control apparatus which provides in the apparatuses and methods of the prior art some of the advantages thereof, while simultaneously overcoming some of the disadvantages normally associated therewith.

Still another object of the present invention is to vary the orientation of a solar panel with respect to the sun.

Yet another object of the present invention is to increase the efficiency of solar panels by having them variably positionable to face the sun.

Even still another object of the present invention is to provide a new and improved a solar panel control apparatus for varying the position of a solar panel mounted upon a roof comprising a solar panel support frame having a horizontal pivot rod mounted there beneath; a vertically receptacle collar having a clevis at its upper end rotatively receiving the pivot rod of the support frame and having a recess extending upwardly from its lower end with internal threads at its lower extent and a cylindrical cavity between the threads and the upper end; a rotatable shaft having a threaded upper end cooperatively secured with the threads of the collar and a handle whereby rotation of the shaft through the handle will act to raise and lower the collar and pivot with the support frame; a turret having a downwardly extending cavity having surfaces adapted to receive the collar; and a turret support plate with a upper face to support the turret, the turret plate having a wheel within the modular home to effect rotation of the plate and the turret whereby rotation of the handle will vary the angular orientation of the support structure with respect to the support plate and the roof while rotation of the wheel will vary the rotational position of the solar panel with respect to the horizontal support plate and roof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is perspective illustration of a van equipped with the solar panel control apparatus constructed in accordance with the principles of the present invention.

FIG. 2 is a side elevational view of the solar panel control apparatus of FIG. 1.

FIG. 3 is a sectional view taken along line 3—3 of FIG. 2.

DESCRIPTION OF THE PREFERRED EMBODIMENT

Figure 4:
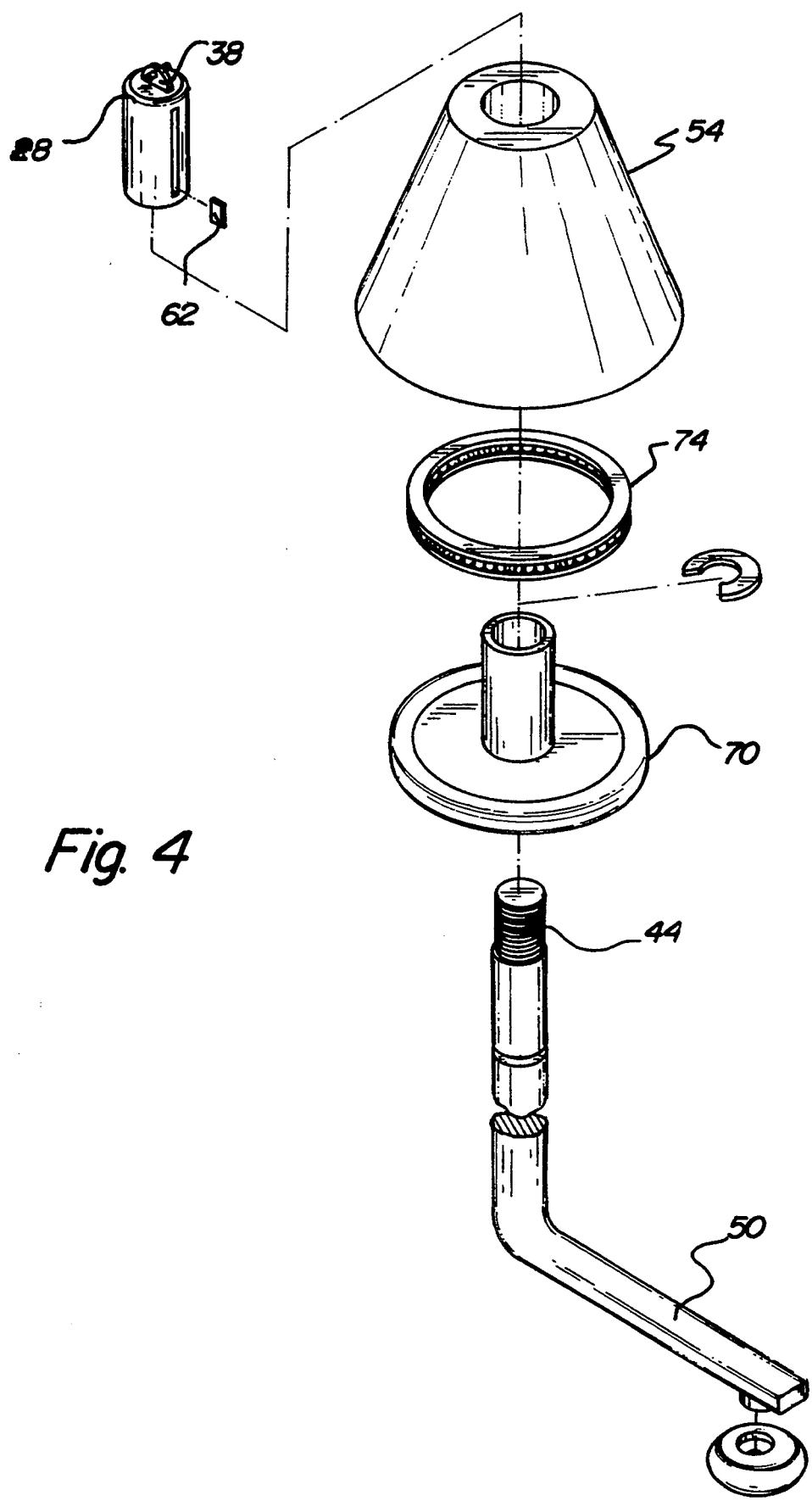
FIG. 4 is an exploded perspective view of the control mechanisms of the prior Figures.

With reference now to the drawings, and in particular to FIG. 1 thereof, a new and improved solar panel control apparatus embodying the principles and concepts of the present invention and generally designated by the reference numeral 10 will be described.

More specifically, FIG. 1 shows a modular home 12 fill with the solar panel control apparatus of the present invention. The solar panel control apparatus 10 functions for varying the position of a solar panel 14 mounted upon the roof 16 of the modular home. Solar panels are conventional staples of commerce for converting solar energy into electrical energy.

The solar panel includes a support frame 20 in a generally rectangular configuration. It is configured to include a horizontal pivot rod 22 mounted beneath at a central extent thereof. Weights 24 are provided along one edge.

Coupled with respect to the support frame 20 is a vertically receptacle collar 28. The collar has a clevis 38 at its upper end. The clevis rotatively receives the pivot rod 22 of the support frame. The collar is formed with a recess 40 extending upwardly from its lower end. The recess is formed with internal threads 42 at its lower extent. Thereabove is a cylindrical cavity between the threads and the upper end of the recess.

A rotatable shaft 46 is next provided. Such shaft has an upper end with threads 44 cooperatively secured with the threads 42 of the collar 24. An operator controlled handle 50 is formed at its lower end extending to within the modular home. In this manner, rotation of the shaft 46 through the handle 50 will act, under the control of a user, to raise and/or lower the collar 28 and pivot with the support frame 20. This acts to vary the angular position of the solar panel with respect to the sun.

Next provided is a turret 54. The turret has a downwardly extending cavity 56. The cavity has surfaces adapted to receive the collar 28. A slot 60 and a spline 62 are coupled to preclude rotational movement between the turret and shaft, but allow axial movement therebetween.

A turret support plate 66 with a lower face and an upper face is employed to support the turret 54. The turret plate has a downwardly located operator controlled wheel 70 within the modular home. The wheel functions to effect rotation of the plate and the turret as may be required due to movement of the vehicle and/or the sun.

Located between the upper surface of the roof of a modular home and the lower surface of the support plate is a bearing assembly 74. In operation and use, rotation of the handle will vary the angular orientation of the support structure with respect to the support plate and the roof of a vehicle while rotation of the wheel will vary the rotational position of the solar panel with respect to the horizontal support plate and roof of the modular home.

Lastly, an outstanding support members 78 positioned on the support plate 66 to limit the vertical movement of the end of the solar panel support remote from the weight means. This allows the panel and its support to face in the direction of movement of the vehicle to reduce wind resistance.

It should be understood that although the present invention has been described being filled on a modular home, it could be readily employed on a van, camper, recreational vehicle or at a wide variety of locations.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A solar panel control apparatus for varying the position of a solar panel mounted upon the roof of a modular home comprising, in combination:

a solar panel support frame in a generally rectangular configuration and having a horizontal pivot rod mounted there beneath at a central extent thereof with weight means along one edge;

a vertically receptacle collar having a clevis at its upper end rotatively receiving the pivot rod of the support frame and having a recess extending upwardly from its lower end with internal threads at its lower extent and a cylindrical cavity between the threads and the upper end;

a rotatable shaft having a threaded upper end cooperatively secured with the threads of the collar and an operator controlled handle at its lower end extending to within the modular home whereby rotation of the shaft through the handle will act to raise and lower the collar and pivot with the support frame;

a turret having a downwardly extending cavity having surfaces adapted to receive the collar with a slot and a spline to preclude rotational movement between the turret and shaft;

a turret support plate with a upper face to support the turret, the turret plate having a downwardly located operator controlled wheel within the modular home to effect rotation of the plate and the turret;

a bearing assembly between the upper surface of the roof of a modular home and the lower surface of the support plate whereby rotation of the handle will vary the angular orientation of the support structure with respect to the support plate and the roof of a vehicle while rotation of the wheel will vary the rotational position of the solar panel with respect to the horizontal support plate and roof of the modular home; and outstanding support members positioned on the support plate to limit the vertical movement of the end of the solar panel support remote from the weight means.

2. A solar panel control apparatus for varying the position of a solar panel mounted upon a roof comprising:

a solar panel support frame having a horizontal pivot rod mounted there beneath;

a vertically receptacle collar having a clevis at its upper end rotatively receiving the pivot rod of the support frame and having a recess extending upwardly from its lower end with internal threads at its lower extent and a cylindrical cavity between the threads and the upper end;

a rotatable shaft having a threaded upper end cooperatively secured with the threads of the collar and a handle whereby rotation of the shaft through the handle will act to raise and lower the collar and pivot with the support frame;

a turret having a downwardly extending cavity having surfaces adapted to receive the collar; and a turret support plate with a upper face to support the turret, the turret plate having a wheel within the modular home to effect rotation of the plate and the turret whereby rotation of the handle will vary the angular orientation of the support structure with respect to the support plate and the roof while rotation of the wheel will vary the rotational position of the solar panel with respect to the horizontal support plate and roof.

3. The apparatus as set forth in claim 2 and further including a bearing assembly between the upper surface of the roof and the lower surface of the support plate.

* * * * *